US011145959B1

(12) United States Patent
Mu et al.

(10) Patent No.: US 11,145,959 B1
(45) Date of Patent: Oct. 12, 2021

(54) ACCESSORY CONFIGURATION FOR ENHANCING WIRELESS SIGNAL RECEPTION OF A USER DEVICE

(71) Applicant: ZEBRA TECHNOLOGIES CORPORATION, Lincolnshire, IL (US)

(72) Inventors: Wei-Yu Mu, Taipei (TW); Prince Wang, Taipei (TW); Yun Sheng Chou, New Taipei (TW); Huan-Yang Chen, Stony Brook, NY (US); Chi-Ming Wang, Taipei (TW)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/926,246

(22) Filed: Jul. 10, 2020

(51) Int. Cl.
*H01Q 1/24* (2006.01)
*H04B 1/3877* (2015.01)

(52) U.S. Cl.
CPC .......... *H01Q 1/243* (2013.01); *H04B 1/3877* (2013.01)

(58) Field of Classification Search
CPC ....... H01Q 1/244; H01Q 1/245; H04B 1/3877
USPC ...................................... 455/575.5
See application file for complete search history.

(56) References Cited

U.S. PATENT DOCUMENTS

| 2012/0206303 | A1* | 8/2012 | Desclos | ................ | H01Q 1/243 343/702 |
| 2016/0380335 | A1* | 12/2016 | Jeong | .................... | H01Q 1/243 343/702 |

* cited by examiner

*Primary Examiner* — Lee Nguyen

(57) ABSTRACT

An accessory configuration for enhancing wireless signal reception of a user device. The accessory, for the user device, may include a housing configured to receive the user device within a cavity; and a radiation element integrated with the housing and configured to affect a radiation pattern of an antenna of the user device that is configured to communicate a signal. The length of the radiation element may be based on a wavelength of the signal. The radiation element may be disposed within a predetermined distance of a zone of the cavity that is configured to receive a portion of the user device that includes the antenna when the user device is installed within the cavity.

20 Claims, 6 Drawing Sheets

ACCESSORY CONFIGURATION FOR ENHANCING WIRELESS SIGNAL RECEPTION OF A USER DEVICE

BACKGROUND

Wireless communication systems, such as a Global Navigation Satellite System (GNSS) a wireless wide area network (WWAN) (e.g., a cellular communication system), and/or the like, utilize one or more radio frequency antennas to facilitate communication between devices. For example, a device, with GNSS capability, may receive positioning signals from one or more GNSS satellites and may determine a location of the device based on the GNSS signals. A device with WWAN capability may receive and/or transmit communication signals from and/or to base stations of the WWAN to facilitate communication with the network and/or other devices communicatively coupled to the network.

SUMMARY

In some implementations, an accessory for a user device includes a housing configured to receive the user device within a cavity; and a radiation element integrated with the housing and configured to affect a radiation pattern of an antenna of the user device that is configured to communicate a signal, wherein: a length of the radiation element is based on a wavelength of the signal, and the radiation element is disposed within a predetermined distance of a zone of the cavity that is configured to receive a portion of the user device that includes the antenna when the user device is installed within the cavity.

In some implementations, a system includes a user device that includes an antenna that is configured to transmit or receive a signal; and an accessory that is configured to be detachable from the user device, the accessory comprising: a housing that is configured to receive the user device within a cavity; and a radiation element that is integrated with the housing and configured to affect a radiation pattern of the antenna, wherein a length of the radiation element is based on a wavelength of the signal, and wherein the radiation element is disposed within a predetermined distance of a zone of the cavity that is configured to receive a portion of the user device that includes the antenna when the user device is installed within the cavity.

In some implementations, a cradle for holding a user device includes a mount mechanism that is configured to attach to a support structure; a housing that is configured to receive the user device within a cavity; and a radiation element that is within the housing and configured to affect a radiation pattern of an antenna of the user device that is configured to communicate a signal, wherein a length of the radiation element is based on a wavelength of the signal, and wherein the radiation element disposed within a predetermined distance of a zone of the cavity that is configured to include the antenna.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

Figure 1:
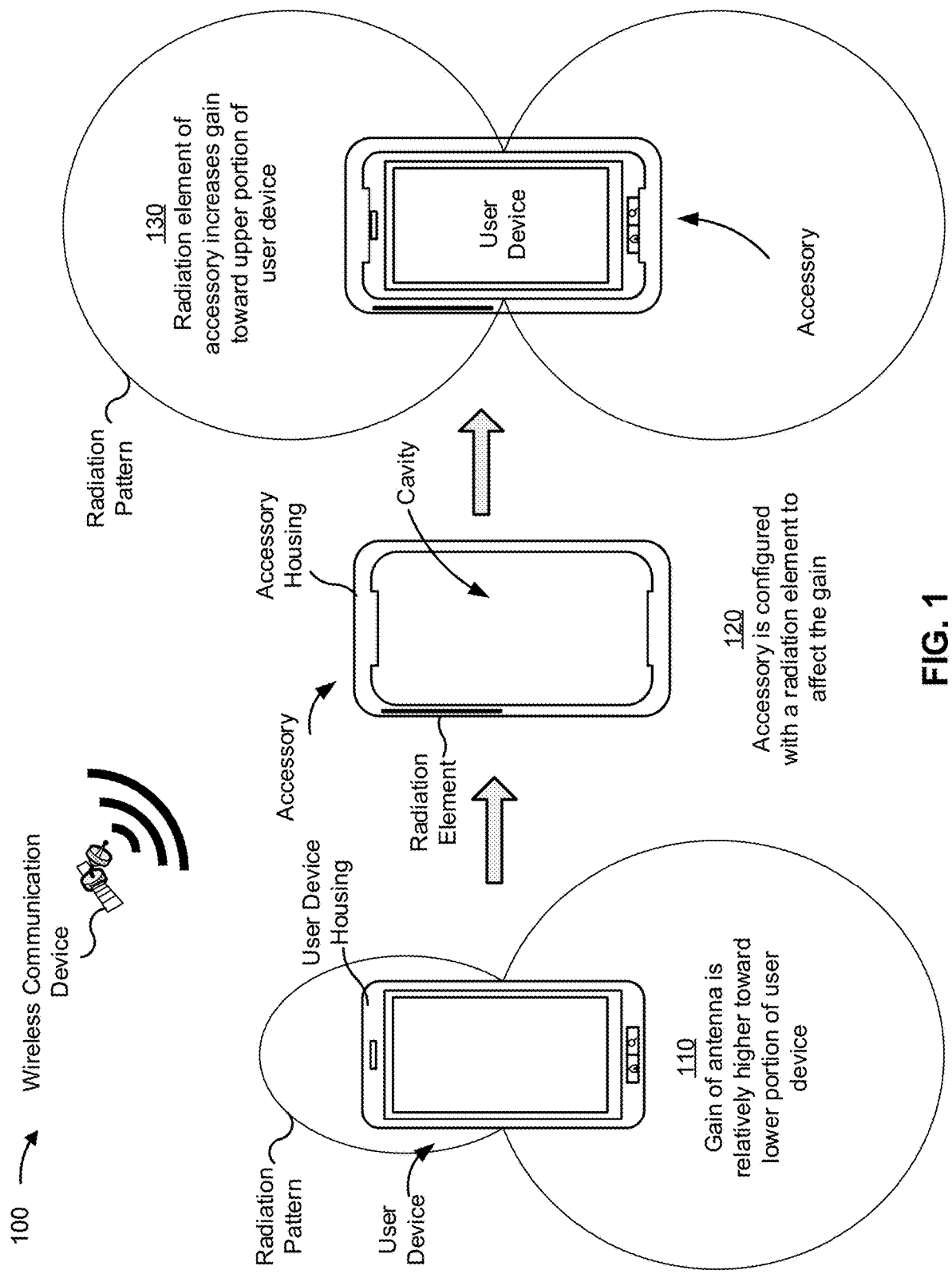
FIG. 1 is a diagram of an example implementation described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

A wireless communication device may receive signals from one or more other devices of a wireless communication system. For example, a user device, with Global Navigation Satellite System (GNSS) capability, may receive GNSS signals from one or more GNSS satellites and may determine a location of the user device based on the GNSS signals. The user device may include an antenna that is configured to enable communication with the one or more GNSS satellites. In such a case, the user device may include an antenna that is configured to enable wireless communication with one or more access points of a wireless wide area network (WWAN), such as one or more base stations of a cellular communication network.

In some instances, due to design and/or configuration constraints, gain of an antenna may be increased toward a particular direction relative to gain in another direction. As a more specific example, a radiation pattern of the antenna may be emphasized toward a lower portion of the user device (e.g., the gain of the antenna is relatively higher toward the lower portion than other portions of the user device). In other words, the radiation pattern of the antenna may be directed away from an upper portion of the user device and, therefore, when in certain positions (e.g., such as within a cradle, case, or other type of accessory), the radio pattern is directed away from the one or more devices of a wireless communication system. In such cases, because signals are received from one or more GNSS satellites (that are in space) and/or one or base stations (that have antennas that are typically at higher altitudes than user devices), the radiation pattern of the antenna may reduce the ability of the user device to receive the signals from the one or more GNSS satellites and/or the one or more base stations. Accordingly, such a radiation pattern may negatively impact an ability of the user device to communicate with the one or more GNSS satellites and/or the one or more base stations. Additionally, the user device may waste computing resources (e.g., memory resources, processing resources, communication resources, power resources, and/or the like) associated with sending or received communications with dropped packets, associated with attempting to process partially received communications, and/or associated with attempting to mitigate relatively low signal quality (e.g., by attempting to re-establish communication with the one or more GNSS satellites, the one more base stations, and/or the like).

Some implementations described herein provide an accessory for a user device that alters a radiation pattern of an antenna of the user device to increase gain of the antenna toward an upper portion of the user device. The accessory comprises a housing configured to receive the user device within a cavity; and a radiation element integrated with the housing. The radiation element may include a conductive element that enables adjustments (e.g., passive adjustments) to the radiation pattern of the antenna of the user device. For example, the radiation element may redirect the radiation pattern toward the upper portion of the user device and, accordingly, toward GNSS satellites. Therefore, the radiation element may improve the ability of the user device to communicate with the GNSS satellites. Further, the radiation and/or accessory, configured as described herein may permit the user device to conserve computing resources that would have otherwise been wasted as described above.

FIG. 1 is a diagram of an example implementation 100 described herein. As shown in FIG. 1, example implementation 100 includes a wireless communication device, a user device, and an accessory for the user device. The wireless communication device may include one or more devices (e.g., a satellite (as shown), a base station, and/or the like) that transmit wireless signals that may be received by the user device. For example, the wireless communication device may include a GNSS satellite that transmits GNSS signals (e.g., GNSS data) that may be received by the user device. Additionally, or alternatively, the wireless communication device may include a base station that transmits and/or receives wireless communication signals of a WWAN. The user device may be any type of mobile device, such as a user equipment, a handheld computer, a tablet computer, and/or the like.

The user device may include an antenna that is configured to transmit and/or receive signals. For example, the antenna may be configured to enable wireless (e.g., radio frequency) communication with the wireless communication device. As an example, the antenna may include a dipole antenna, a multiple-input and multiple-output (MIMO) antenna, a planar inverted F antenna (PIFA), and/or the like. The antenna is situated within a user device housing (e.g., an enclosure) of the user device and, as described herein, produces a particular radiation pattern (e.g., that is based on a design of the antenna, a position of the antenna within the user device housing, positions or types of other components of the user device, and/or the like). The radiation pattern may include a far field radiation pattern that is based on a wavelength of signals that communicated via the antenna.

The accessory may include a case that is configured to enclose a portion of the user device. Additionally, or alternatively, the accessory may include a cradle that is configured to support the user device (e.g., when mounted to a structure, such as a dashboard or support of a vehicle). The accessory may include a housing (e.g., an accessory housing) that is configured to receive the user device within a cavity of the accessory housing. The cavity may correspond to a three-dimensional (3D) space. The accessory may have different shapes in different contexts. For example, internal dimensions of the accessory (e.g., of the accessory housing) may match external dimensions of the user device such that the user device tightly fits into the accessory. The accessory may match dimensions of a particular user device that the accessory is configured to enclose and/or support.

The accessory may be configured to be detachable from the user device. As shown in FIG. 1, the accessory includes a radiation element. The radiation element may affect the radiation pattern of the antenna when the user device is received within the accessory, as discussed in more detail below.

As shown in FIG. 1, and by reference number 110, a gain of the antenna is relatively higher toward a lower portion of the user device. Accordingly, as illustrated in FIG. 1, the radiation pattern may be emphasized toward a lower portion of the user device (e.g., when the user device is not installed within the cavity of the accessory). The lower portion of the user device and the upper portion of the user device may be relative to an intended grip of a user of the user device and/or an intended use position of the user device.

As described herein, the antenna may be configured to have a first gain, in a first direction of the radiation pattern, that is greater than a second gain, in a second direction of the radiation pattern. The first direction of the radiation pattern may be opposite (e.g., polar opposite) of the second direction of the radiation pattern. For example, as shown in FIG. 1, the first direction of the radiation pattern may be directed toward the lower portion of the user device (e.g., away from the wireless communication device), and the second direction of the radiation pattern may be directed toward the upper portion of the user device (e.g., toward the wireless communication device).

In this way, as shown in FIG. 1, a gain of the antenna toward the lower portion of the user device may exceed a gain toward the upper portion of the user device, causing the radiation pattern to be directed toward the lower portion of the user device. Accordingly, the radiation pattern may be emphasized toward the lower portion of the user device.

As shown in FIG. 1, and by reference number 120, the accessory may be configured with the radiation element to affect the gain of the antenna, and correspondingly, the radiation pattern. The radiation element may be integrated with the accessory housing. For example, the radiation element may be attached to the accessory housing. For instance, the radiation element may be inserted within a slot of the accessory housing. Alternatively, the radiation element may be built within the accessory housing. For instance, the radiation element may be enclosed within the accessory housing. In some implementations, the radiation element is detachable from the housing.

The radiation element may include a conductive element (e.g., a metal) that is configured to affect the radiation pattern of the antenna of the user device (e.g., without contacting the antenna). The radiation element may be located within a threshold distance from the antenna when the user device is received within the accessory. For example, a portion of the user device that includes the antenna may be received within a zone of the cavity (e.g., a portion of the cavity) and the radiation element may be located within a predetermined distance of the zone of the cavity (or antenna zone) when the user device is installed within the cavity.

As shown in FIG. 1, and by reference number 130, the radiation element increases the gain toward the upper portion of the user device, thereby redirecting the radiation pattern toward the upper portion. For example, the radiation element may change the gain of the antenna in a particular direction (e.g., increase the gain toward the upper portion, as shown). The radiation element may induce a resonance of the radiation pattern to increase the gain toward the upper portion of the user device. The particular direction may be associated with and/or based on a location of the radiation element relative to the a position of the antenna. As explained above, the radiation element may be located within a predetermined distance of the antenna of the user device and the antenna may be located in the upper portion of the user device. Accordingly, the particular direction may correspond to the upper portion of the user device.

In example implementation 100, because the radiation element is located within a threshold distance from the antenna when the user device is received within the accessory, the radiation element may be inductively connected to (coupled with) the antenna. Such an inductive connection may enable the radiation element to redirect the radiation pattern toward the location of the radiation element or, in other words, toward the upper portion of the user device (e.g., toward the wireless communication device).

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
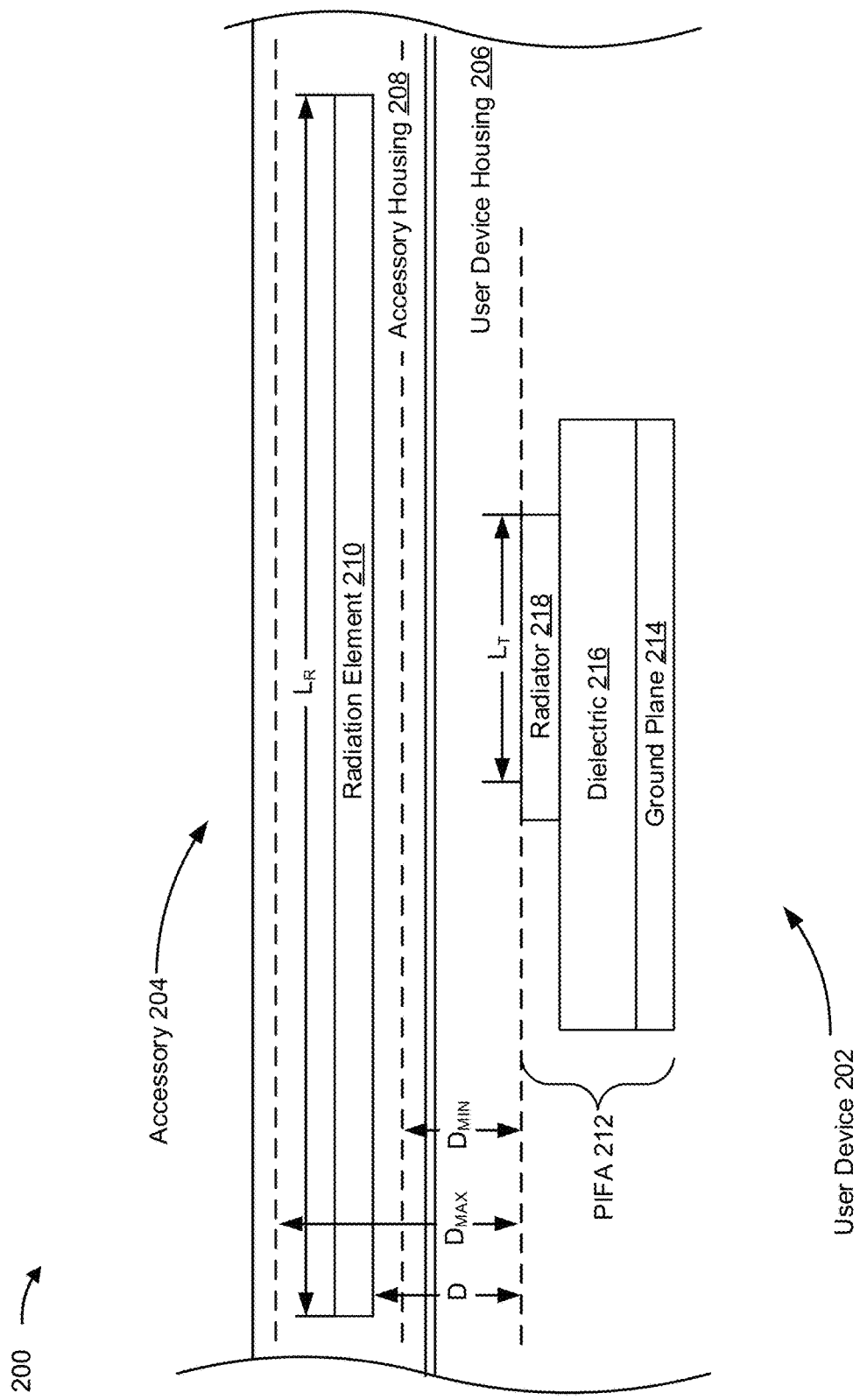
FIG. 2 is a diagram of an example implementation described herein.

FIG. 2 is a diagram of an example implementation 200 described herein. Example implementation 200 may represent a cross-sectional view of a user device 202 (e.g., the user device of FIG. 1) received within an accessory 204 (e.g., the accessory of FIG. 1). As shown in FIG. 2, accessory 204 includes a user device housing 206, an accessory housing 208, and a radiation element 210.

In some implementations, the accessory housing 208 may be configured to form a non-conductive barrier between the radiation element 210 and an antenna 212 (shown as "PIFA 212") when the user device 202 is installed within the accessory 204 (e.g., within a cavity of the accessory 204). As described herein, the radiation element 210 may be integrated with the accessory housing 208.

The size and/or shape of the radiation element 210 may be based on the antenna 212 (e.g., a configuration of the antenna 212) and/or the accessory 204 (e.g., a shape of the accessory housing). As shown in FIG. 2, the radiation element 210 may have a length ($L_R$). The length ($L_R$) of the radiation element 210 may be based on a wavelength ($\lambda$) of a signal communicated by the user device 202 (e.g., communicated by the antenna 212). For example, the length ($L_R$) of the radiation element 210 may be between $\lambda/4$ and $3\lambda/4$. As a specific example, the length ($L_R$) of the radiation element 210 may be determined based on the following equation: $L_R=3\lambda/5$. In other words, the length ($L_R$) of the radiation element 210 may be ⅗ of the wavelength ($\lambda$). As an example, the length ($L_R$) of the radiation element 210 may be approximately seventy-eight millimeters (78 mm) for a wavelength of one hundred and thirty millimeters (130 mm).

As shown in FIG. 2, the radiation element 210 is at a distance (D) of the antenna 212, when the user device 202 is received within the accessory housing 208. The distance (D) may be configured to be within a particular range (e.g., between a minimum distance ($D_{MIN}$) and a maximum distance ($D_{MAX}$)) or a threshold distance (within the maximum distance ($D_{MAX}$) of the particular range, which is referred to herein as "threshold distance ($D_{MAX}$)") when the user device 202 is installed within a cavity of the accessory 204. Accordingly, the distance (D) may change based on a particular position of the user device 202 relative to the accessory 204 (e.g., may be different each time the user device 202 is installed within the accessory 204, may change over time due to movement of the user device 202 within the accessory 204, and/or the like).

As shown in FIG. 2, the antenna 212 may comprise a PIFA that includes a ground plane 214, a dielectric 216 formed on the ground plane 214, and a radiator 218 formed on the dielectric. The radiation element 210 may be within the threshold distance ($D_{MAX}$) of the radiator 218. For example, a portion of the radiation element 210 may be within the threshold distance ($D_{MAX}$) of a portion of the radiator 218. The threshold distance ($D_{MAX}$) and/or range of the minimum distance ($D_{MIN}$) to the threshold distance ($D_{MAX}$) may vary in different contexts. For example, the threshold distance ($D_{MAX}$) may be based on the antenna 212 (e.g., a size and/or a configuration of the antenna). For instance, the threshold distance ($D_{MAX}$) may be based on a size of the radiator 218.

As an example, the distance (D) may be configured to be within a range that is based on a length ($L_T$) of the radiator 218. For instance, the range may be proportional to the length ($L_T$) of the radiator 218. The length ($L_T$) of the radiator 218 may be based on the wavelength ($\lambda$). For example, the length ($L_T$) of the radiator 218 may be determined based on a range or a set of lengths that depend on the wavelength and/or the following equation: $L_T=\lambda/4$. The distance (D) may be configured to be approximately from five millimeters (5 mm) ($D_{MIN}=5$ mm) to approximately ten millimeters (10 mm) ($D_{MAX}=10$ mm) for a length ($L_T$) of the radiator 218 (e.g., when the radiator 218 is approximately thirty-two millimeters (32 mm) long). As explained above, the radiation element 210 may be located within the predetermined distance of the antenna 212 (e.g., corresponding to the threshold distance ($D_{MAX}$)). In this instance, the predetermined distance may correspond to approximately ten millimeters (10 mm).

In some examples, a width of the radiation element 210 may be based on and/or correspond to the threshold distance ($D_{MAX}$). For instance, a width of the radiation element may be approximately from five millimeters (5 mm) to approximately ten millimeters (10 mm) for a configured distance (D), which may be between approximately five millimeters (5 mm) to approximately ten millimeters (10 mm). The dimensions and measurements described herein are merely provided as examples. Other examples may differ from the dimensions and measurements described herein (e.g., based on the wavelength of a signal communicated via the antenna 212). The radiation element 210 may have any size, shape, or orientation, and is not limited to the size, shape, and orientation shown in FIG. 2.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 1.

Figure 3:
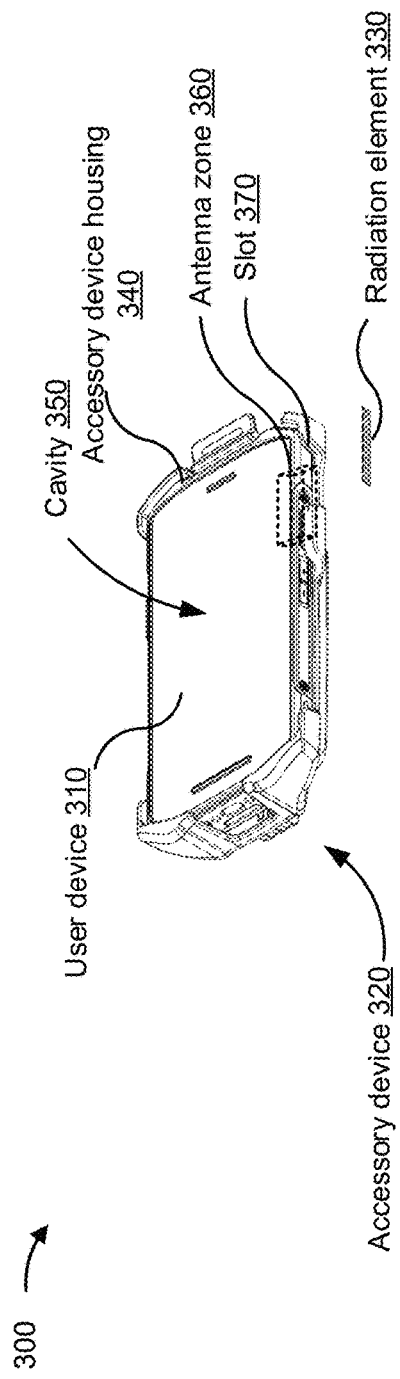
FIG. 3 is a diagram of an example implementation described herein.

FIG. 3 is a diagram of an example implementation 300 described herein. As shown in FIG. 3, example implementation 300 includes a user device 310 (which may correspond to the user device of FIG. 1), an accessory 320 (which may correspond to the accessory of FIG. 1), and a radiation element 330 (which may correspond to the radiation element of FIG. 1). The accessory 320 may include an accessory housing 340 (which may correspond to the accessory housing of FIG. 1) that includes a cavity 350 (which may correspond to the cavity of FIG. 1).

The cavity 350 may be configured to receive the user device 310. As shown in FIG. 3, the cavity 350 may include an antenna zone 360 that is configured to receive a portion of the user device 310 that includes an antenna of the user device 310. The accessory housing 340 may further include a slot 370 that is configured to receive the radiation element 330. For example, the radiation element 330 may be configured to be inserted within the slot 370. As shown in FIG. 3, the radiation element 330 may be configured to be detachable (or removable) from the accessory housing 340. When the radiation element 330 is removed from the accessory housing 340, the radiation pattern of an antenna of the user device 310 may be directed more toward a lower portion of the user device 310. When the radiation element 330 is inserted within the accessory housing 340, the radiation pattern of an antenna of the user device 310 may be directed more toward an upper portion of the user device 310, as explained below in connection with FIG. 4.

As indicated above, FIG. 3 is provided as an example. Other examples may differ from what is described with regard to FIG. 3. For example, the radiation element 330 may have any size, shape, or orientation, and is not limited to the size, shape, and orientation shown in FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
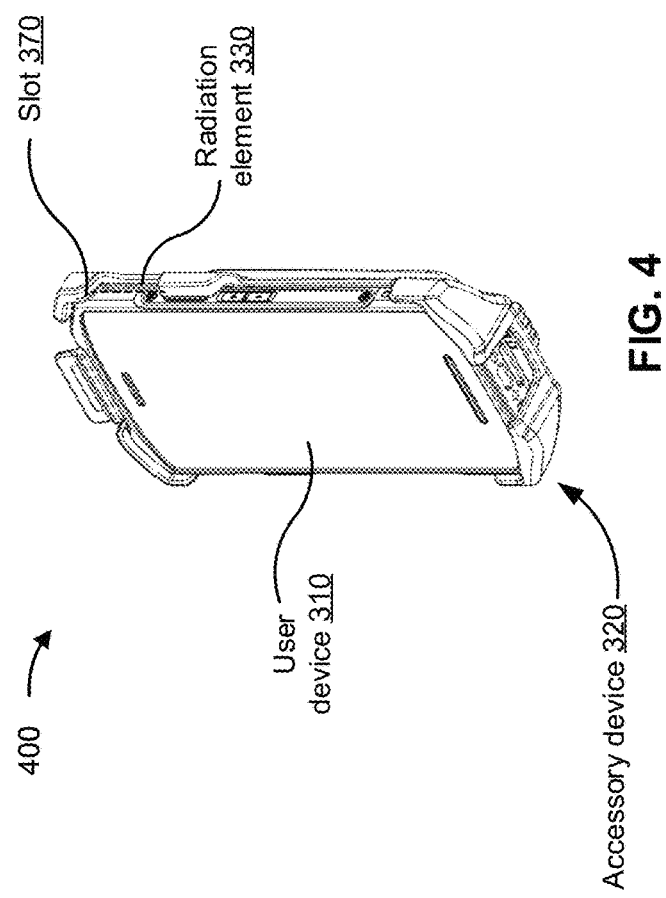
FIG. 4 is a diagram of an isometric view of FIG. 3.

FIG. 4 is a diagram of an isometric view 400 of FIG. 3. As shown in FIG. 4, the radiation element 330 may be received within the slot 370. When the radiation element 330 is received within the slot 370, the radiation element 330 may redirect a radiation pattern of the antenna more toward an upper portion of the user device 310 (e.g., toward a GNSS satellite and/or a base station). Accordingly, the radiation element 330 may improve communication between the user device 310 and a GNSS satellite and/or a base station.

As indicated above, FIG. 4 is provided as an example. Other examples may differ from what is described with regard to FIG. 4.

Figure 5:
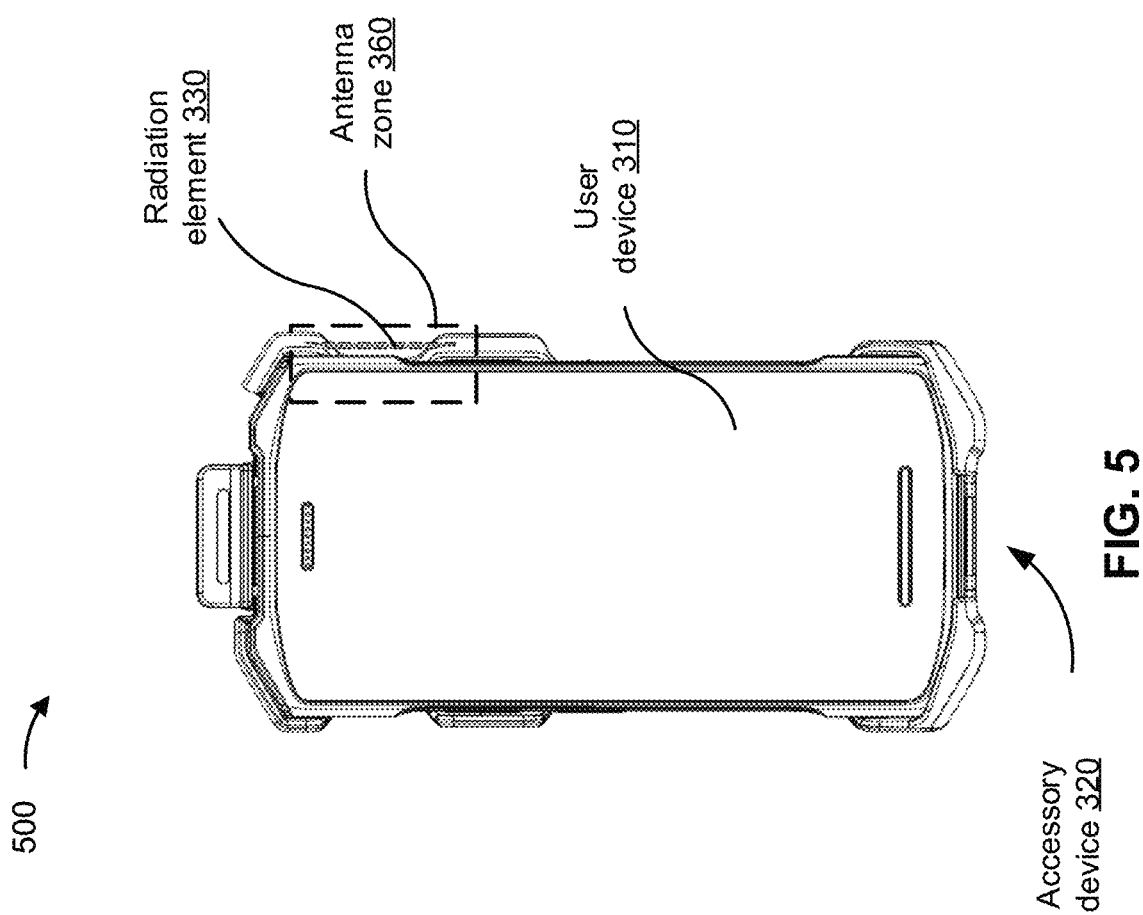
FIG. 5 is a diagram of a top view of FIG. 3.

FIG. 5 is a diagram of a top view 500 of FIG. 3. As shown in FIG. 5, the radiation element 330 may be received within the slot 370 and may be within the threshold distance of the antenna zone 360. Because the antenna zone 360 (which is configured to receive a portion of the user device 310 that includes the antenna) is located in an upper portion of the user device 310 and because the radiation element 330 is within the threshold distance of the antenna zone 360, the radiation element 330 may direct the radiation pattern toward the upper portion of the user device 310 (e.g., toward a GNSS satellite and/or a base station). Accordingly, the radiation element 330 may improve communication between user device 310 and a GNSS satellite and/or a base station.

As indicated above, FIG. 5 is provided as an example. Other examples may differ from what is described with regard to FIG. 5.

Figure 6:
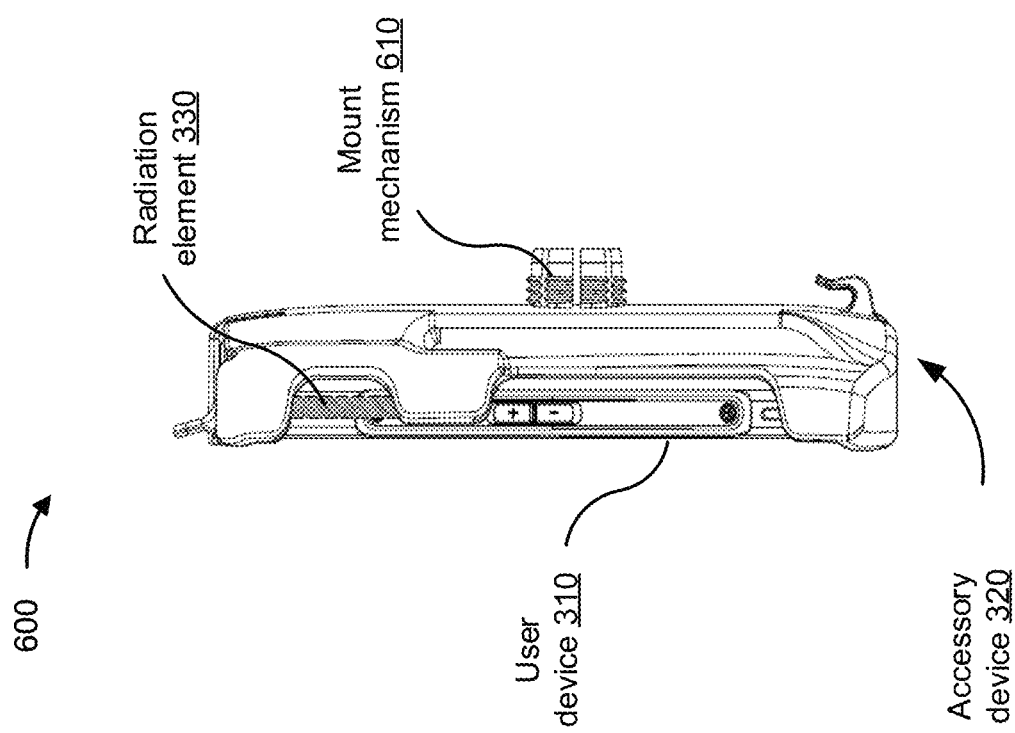
FIG. 6 is a diagram of a side view of FIG. 3.

FIG. 6 is a diagram of a side view 600 of FIG. 3. As shown in FIG. 6, the accessory 320 may include a mount mechanism 610. Mount mechanism 610 may include one or more components that are configured to be attached to a support structure. For example, mount mechanism 610 may be configured to be attached to a portion of a vehicle (e.g., a dashboard, a console, a window, a vent, and/or the like) or to another accessory that is configured to be attached to the portion of the vehicle. Mount mechanism 610 may orient a lower portion of the user device 310 toward the support structure. Additionally, mount mechanism 610 may orient an upper portion of the user device 310 away from the support structure. For example, mount mechanism 610 may orient the upper portion of the user device 310 in an upward direction (e.g., toward a satellite) to improve GNSS communication capability and/or WWAN capability of the user device 310.

As indicated above, FIG. 6 is provided as an example. Other examples may differ from what is described with regard to FIG. 6.

Figure 7:
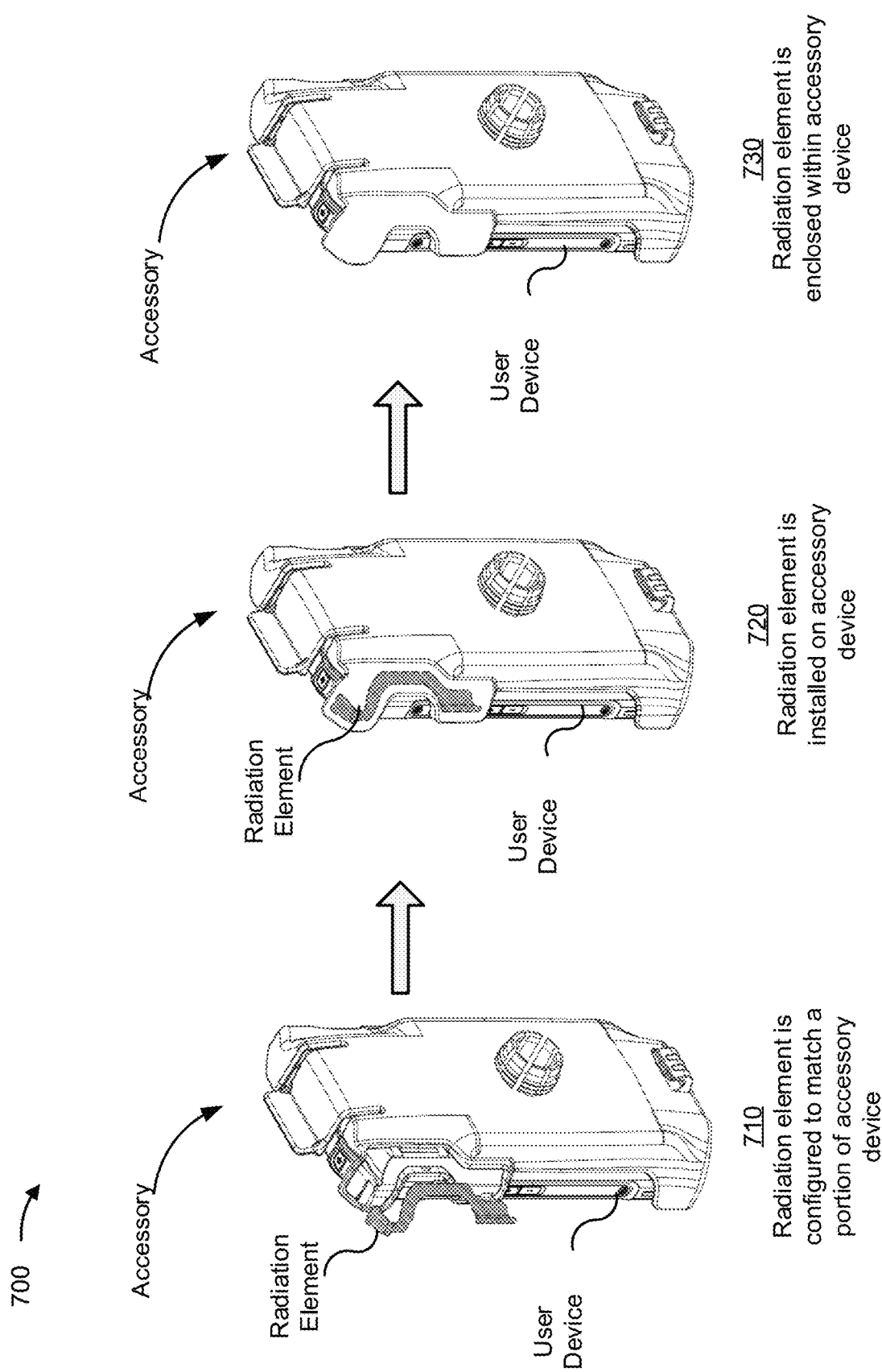
FIG. 7 is a diagram of an example implementation described herein.

FIG. 7 is a diagram of an example implementation 700 described herein. As shown in FIG. 7, example implementation 700 includes a user device (which may correspond to the user device of FIG. 1), an accessory (which may correspond to the accessory of FIG. 1), and a radiation element (which may correspond to the radiation element of FIG. 1).

As shown in FIG. 7, and by reference number 710, the radiation element may be configured to match a portion of the accessory. For example, the radiation element may be shaped to match a portion of a perimeter of the accessory. For instance, the radiation element may be shaped to match a portion of a perimeter of a cavity (of the accessory) that is configured to receive the user device. The radiation element may have any size, shape, or orientation, and is not limited to the size, shape, and orientation shown in FIG. 7.

As shown in FIG. 7, and by reference number 720, the radiation element may be installed on the accessory. For example, the radiation element may be installed on the portion of the accessory. For instance, the radiation element may be attached to the portion of the accessory using one or more methods for attaching a component to a support structure.

As shown in FIG. 7, and by reference number 730, the radiation element may be enclosed within the accessory. The radiation element may be enclosed within the accessory to prevent the radiation element from being exposed to natural elements (e.g., water, dust, and/or the like) and to preserve the durability of the radiation element.

As indicated above, FIG. 7 is provided as an example. Other examples may differ from what is described with regard to FIG. 7.

Figure 8:
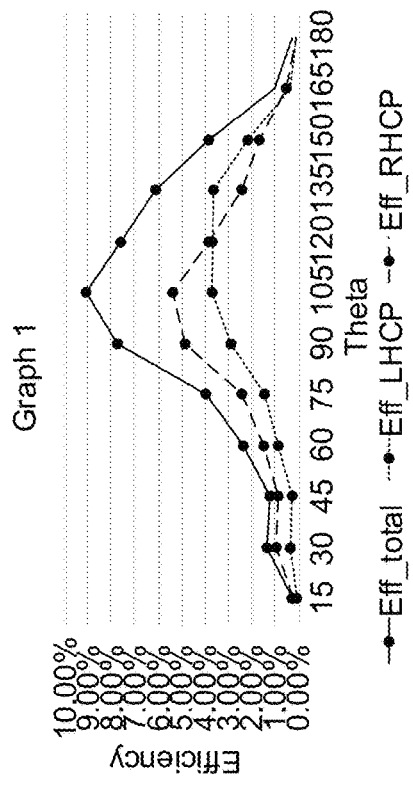
FIG. 8 is a diagram of illustrating an improvement in GNSS capability of a user device based on implementations described herein.
Figure 8:
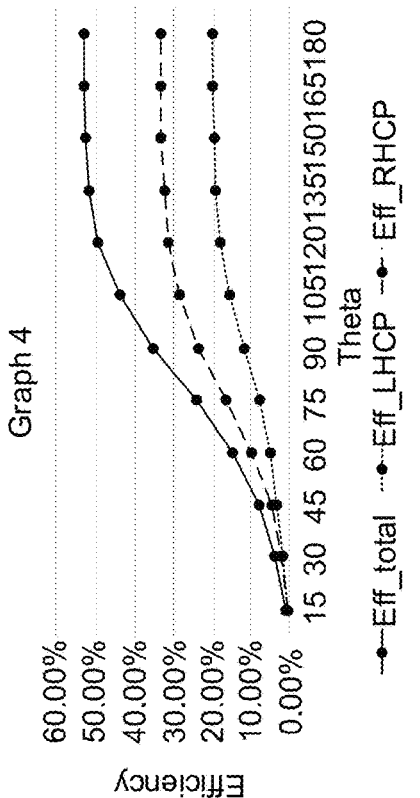
Figure 8:
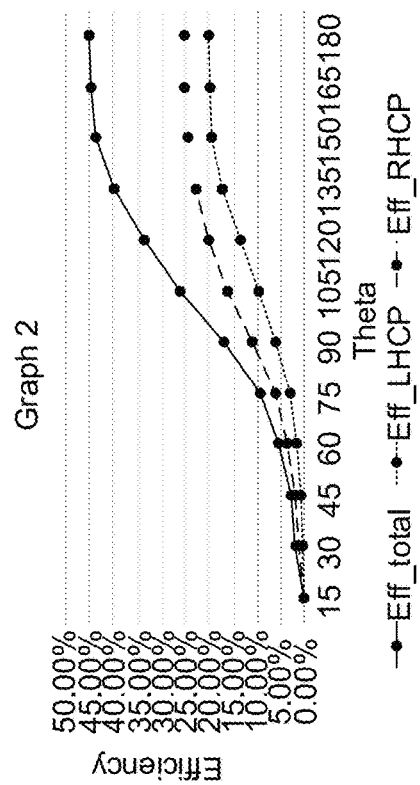

FIG. 8 is a diagram of illustrating an improvement in GNSS capability of a user device based on implementations described herein. As shown in FIG. 8, Graph 1 and Graph 2 illustrate an efficiency of a user device with respect to receiving and/or processing signals. The user device (of Graph 1 and Graph 2) may be inserted in an accessory housing that does not include a radiation element described herein. As shown in FIG. 8, Graph 3 and Graph 4 illustrate an efficiency of the user device with respect to receiving and/or processing signals. The user device (of Graph 3 and Graph 4) may be inserted in an accessory housing that includes the radiation element described herein.

Theta may represent an angle associated with different portions of the user device. For example, a value of Theta from zero degrees to eighty-nine degrees may represent an upper portion of the user device while a value of Theta from ninety-one degrees to one hundred and eighty degrees may represent a lower portion of the user device. A value of Theta of ninety degrees may represent a middle portion of the user device. Eff_RHCP may represent an efficiency, of the user device, with respect to receiving and/or processing Right Hand Circular Polarized (RHCP) signals (e.g., GPS signals). Eff_LHCP may represent an efficiency, of the user device, with respect to receiving and/or processing Left Hand Circular Polarized (LHCP) signals (e.g., non-GPS signals). Eff_total may represent an overall efficiency, of the user device, with respect to receiving and/or processing RHCP signals and LHCP signals.

As shown in FIG. 8, Graph 3 and Graph 4 illustrate an improvement of the efficiency of the user device (received in an accessory with the radiation element) with respect to receiving and/or processing RHCP signals (e.g., GPS signals) when compared to the efficiency of the user device illustrated by Graph 1 and Graph 2. Accordingly, the radiation element may improve the ability of the user device to communicate with GNSS satellites.

The values described above and shown in FIG. 8 are merely provided as examples. Other examples may differ from these values. As indicated above, FIG. 8 is provided as an example. Other examples may differ from what is described with regard to FIG. 8.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive, and should instead be understood as potentially combinable if such combinations are permissive in any way. In other words, any feature disclosed in any of the aforementioned examples or implementations may be included in any of the other aforementioned examples or implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. An accessory for a user device, comprising:
a housing configured to receive the user device within a cavity; and
a radiation element integrated with the housing and configured to affect a radiation pattern of an antenna of the user device that is configured to communicate a signal, wherein:
a length of the radiation element is based on a wavelength of the signal, and
the radiation element is disposed within a predetermined distance of a zone of the cavity that is configured to receive a portion of the user device that includes the antenna when the user device is installed within the cavity.

2. The accessory of claim 1, wherein the length is configured to be greater than half of the wavelength.

3. The accessory of claim 1, wherein the radiation element is within a threshold range of a transmission line of the antenna,
wherein the predetermined distance corresponds to a maximum of the threshold range.

4. The accessory of claim 1, wherein the antenna is configured to have a first gain that is toward a first direction of the radiation pattern and a second gain that is toward a second direction of the radiation pattern, and
wherein the first gain is configured to be greater than the second gain, and
wherein the radiation element is configured to increase the second gain of the radiation pattern.

5. The accessory of claim 4, wherein the first direction is a polar opposite of the second direction.

6. The accessory of claim 4, wherein the first direction is directed toward a lower portion of the user device, and the second direction is directed toward an upper portion of the user device.

7. The accessory of claim 1, wherein the accessory comprises a cradle for the user device.

8. The accessory of claim 1, wherein the radiation element is attached to the housing by being inserted into a slot in the housing.

9. The accessory of claim 1, wherein the radiation element is shaped to match a portion of a perimeter of the cavity.

10. The accessory of claim 1, wherein the housing is configured to form a non-conductive barrier between the radiation element and the antenna when the user device is installed within the cavity.

11. A system, comprising:
a user device that includes an antenna that is configured to transmit or receive a signal; and
an accessory device that is configured to be detachable from the user device, the accessory device comprising:
a housing that is configured to receive the user device within a cavity; and
a radiation element that is integrated with the housing and configured to affect a radiation pattern of the antenna,
wherein a length of the radiation element is based on a wavelength of the signal, and
wherein the radiation element is disposed within a predetermined distance of a zone of the cavity that is configured to receive a portion of the user device that includes the antenna when the user device is installed within the cavity.

12. The system of claim 11, wherein the antenna comprises a planar inverted F antenna (PIFA) that is within an enclosure of the user device.

13. The system of claim 11, wherein the antenna is configured to enable communication with a global navigation satellite system.

14. The system of claim 11, wherein the length of the radiation element is at least half of the wavelength, and the predetermined distance corresponds to a maximum of a threshold range from the antenna,
wherein the radiation element is disposed within the threshold range based on an integration with the housing.

15. The system of claim 11, wherein the accessory device comprises at least one of:
a case that is configured to enclose a portion of the user device, and
a cradle that is configured to support the user device.

16. A cradle for holding a user device, the cradle comprising:
a mount mechanism that is configured to attach to a support structure;
a housing that is configured to receive the user device within a cavity; and
a radiation element that is within the housing and configured to affect a radiation pattern of an antenna of the user device that is configured to communicate a signal,
wherein a length of the radiation element is based on a wavelength of the signal, and
wherein the radiation element disposed within a predetermined distance of a zone of the cavity that is configured to include the antenna.

17. The cradle of claim 16, wherein the mount mechanism, when the user device is installed within the cavity, is configured to:
orient a lower portion of the user device toward the support structure, and
orient an upper portion of the user device away from the support structure.

18. The cradle of claim 17, wherein the antenna is configured to have a first gain that is toward the lower portion and a second gain that is toward the upper portion,
wherein the first gain is greater than the second gain, and
wherein the radiation element is configured to increase the second gain.

19. The cradle of claim 16, wherein the radiation element is configured to be at least one of:
received within a slot in the housing, and
configured to be detachable from the housing.

20. The cradle of claim 16, wherein the length of the radiation element is greater than half of the wavelength.

* * * * *